(12) United States Patent
Mao (10) Patent No.: US 8,751,332 B2
(45) Date of Patent: Jun. 10, 2014

(54) METHOD AND SYSTEM FOR FACILITATING PRODUCT SHOPPING

(75) Inventor: Maode Mao, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/112,747

(22) Filed: May 20, 2011

(65) Prior Publication Data

US 2012/0296775 A1   Nov. 22, 2012

(51) Int. Cl.
    *G06Q 30/00*  (2012.01)
(52) U.S. Cl.
    USPC ..................................... 705/26.64; 705/26.1
(58) Field of Classification Search
    USPC ..................................... 705/26.1, 27.1, 26.64
    See application file for complete search history.

(56) References Cited

U.S. PATENT DOCUMENTS 8,290,818 B1 * 10/2012 Levitan et al. ............... 705/26.8
2010/0312724 A1 * 12/2010 Pinckney et al. ............... 706/11

OTHER PUBLICATIONS

Anonymous, "eBay Adds Active Decisions' Buyer's Guide to Computer, Photo and Electronic Categories," PR Newswire, Apr. 24, 2001.*

* cited by examiner

*Primary Examiner* — Brandy A Zukanovich
(74) *Attorney, Agent, or Firm* — Schwegman, Lundberg & Woessner, P.A.

(57) ABSTRACT

A method and a system to facilitate finding a product (e.g., camera) and corresponding product accessories are described. A selection of a theme mode from a plurality of theme modes is received. A list of product models and a list of product accessory models based on the theme mode are presented. A selection of a product model combination including a product model and at least one product accessory model respectively from the list of product models and the list of product accessory models is received. A list of product combinations based on the product model combination is retrieved from a database. Each product combination include a product and at least one product accessory respectively supplied from one of product suppliers and one of product accessory suppliers. The list of product combinations may be ranked based on a sum value of a product value and at least one product accessory value in each product combination.

6 Claims, 6 Drawing Sheets

METHOD AND SYSTEM FOR FACILITATING PRODUCT SHOPPING

TECHNICAL FIELD

The present application relates generally to information processing and particularly, but not by way of limitation, to systems and methods to facilitate users in product shopping over a network.

BACKGROUND

With the development of computer and network related technologies, more users (e.g., sellers and buyers) participate in e-commerce activities or events. For example, sellers may attempt to sell products (e.g., cameras and/or camera accessories) to buyers via networks (e.g., the Internet). However, in many situations, sellers may not provide buyers with efficient or convenient approaches to finding products that are attractive to buyers.

BRIEF DESCRIPTION OF THE DRAWINGS

Some embodiments are illustrated by way of examples and not limitation in the figures of the accompanying drawings in which.

DETAILED DESCRIPTION

Example methods and systems to facilitate buyers in camera shopping via a network are described. In the following description, for purposes of explanation, numerous specific details are set forth in order to provide a thorough understanding of example embodiments. It will be evident, however, to one skilled in the art that the present application may be practiced without these specific details.

Example methods and systems to facilitate buyers in finding product (e.g., camera) combinations via a network are described. In e-commerce sites (like eBay®), many cameras and camera accessories (e.g., flash lights or tripods) from various resources (e.g., different sellers or suppliers) are provided to buyers, who may buy a combination of a camera and at least one camera accessory (e.g., a tripod) in one purchase. However, it could be time consuming for a buyer to find a satisfactory combination of a camera and at least one camera accessory that might meet her interests. For example, cameras of the same model may be provided from different providers and thus may have differences in price, shipping fee, capacity vs. price ratio, and/or reputation. In an embodiment, a system having a camera combination ranking module may facilitate the buyer in finding a camera combination that may meet her interests. The camera combination ranking module may rank a list of camera combinations, based on a sum value of a camera value and a camera accessory value in each camera combination for example. The list of camera combinations may facilitate the buyer in finding a suitable camera combination that may meet her interests (e.g., lower price or higher capacity vs. price ratio).

Example methods and systems to facilitate buyers in evaluating product (e.g., camera) models via a network are also described. In e-commerce sites, many product (e.g., camera) models (e.g., Nikon® D100, or Nikkor® AF 18-35) are provided to buyers. However, it could be time consuming for a buyer to find a satisfactory camera model that meets her interests without professional suggestions. In an embodiment, a system including a photo search engine and a photo ranking module may facilitate the buyer in evaluating a candidate camera model (e.g., Nikon® D100) to be used in a photography mode (e.g., "portrait", "landscape", or "sports" photography theme). The photo search engine may retrieve a list of photos taken by the candidate camera model in a selected mode (e.g., "portrait"). The photo ranking module may rank the list of photos, for example based on scores given to the list of photos by photo viewers. The ranked list of photos may facilitate the buyer in evaluating the candidate camera model.

Platform Architecture

Figure 1:
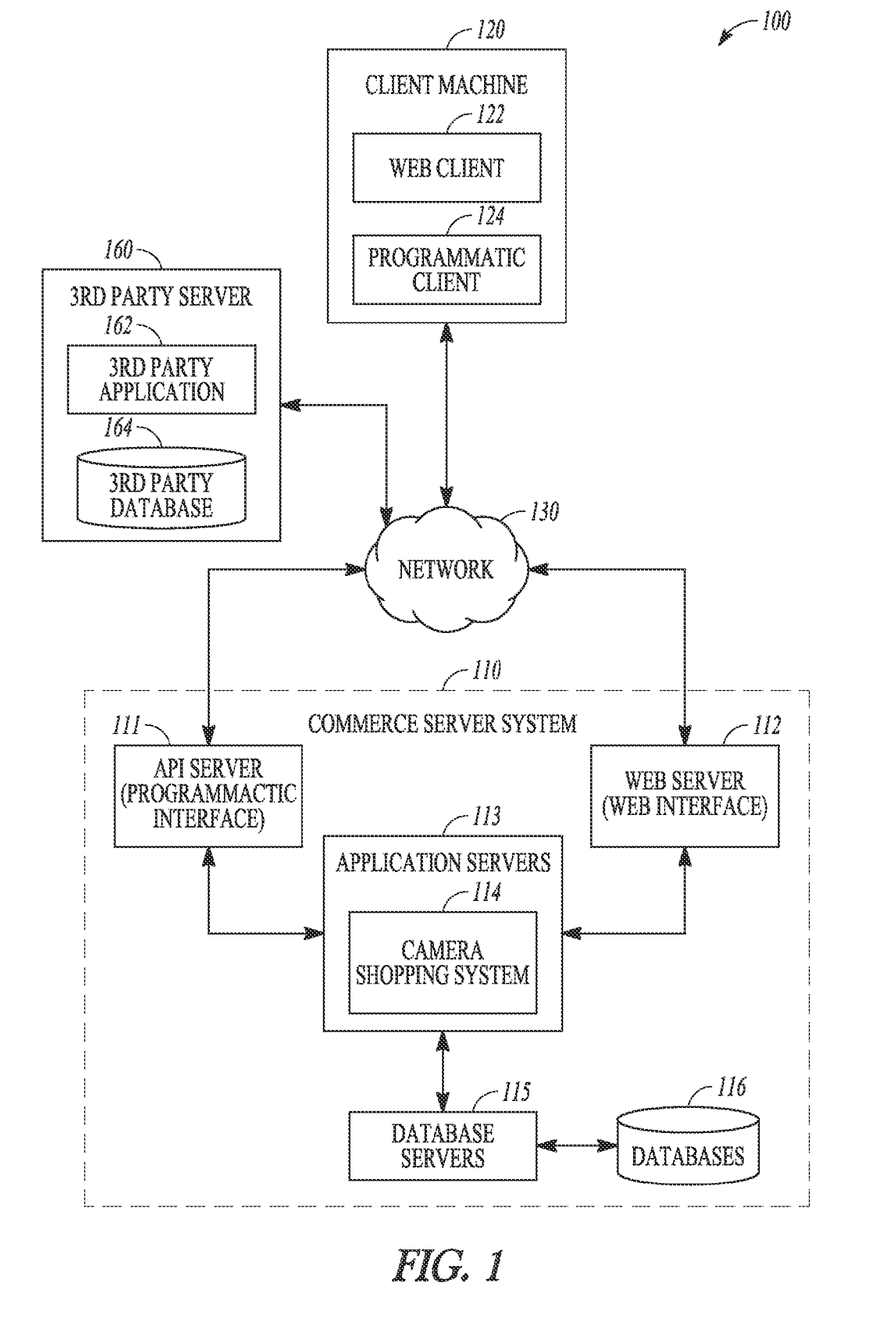
FIG. 1 is a network diagram illustrating an e-commerce system having a client-server architecture configured to facilitate product (e.g., camera) shopping in accordance with an embodiment.

FIG. 1 is a network diagram depicting an e-commerce shopping system 100 having a client-server architecture to facilitate buyers in product (e.g., camera) shopping in accordance with an embodiment. The e-commerce shopping system 100 may include a commerce server system 110 and at least one client machine (e.g., a PC computer) 120, which is inter-connected via a network (e.g., the Internet or Wide Area Network (WAN)) 130.

The network-based commerce server system 110 provides server-side functionality via the network 130 to the one or more client machines 120. The network-based commerce server system 110 includes an Application Program Interface (API) server 111, a web server 112, at least one application server 113, a database server 115, and a database 116 for example. The Application Program Interface (API) server 111 and the web server 112 are coupled to, and provide programmatic and web interfaces respectively to the application server 113.

Figure 2:
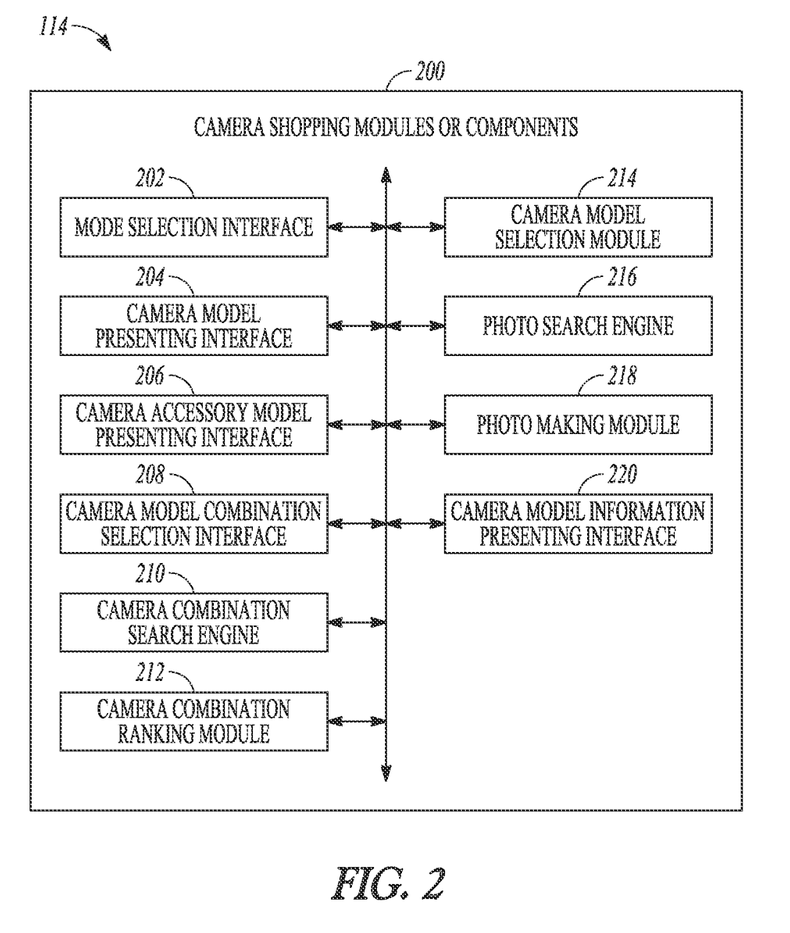
FIG. 2 is a block diagram illustrating a camera shopping system including multiple product (e.g., camera) shopping modules or components in accordance with an embodiment.

The application server 113 may include at least a product (e.g., camera) shopping system 114, which may include multiple camera shopping modules or components 200 as shown in FIG. 2. The product (e.g., camera) shopping system 114 may facilitate buyers in product (e.g., camera) shopping. In an embodiment, the camera shopping system 114 may facilitate buyers in finding camera combinations via the network 130. In another embodiment, the camera shopping system 114 may facilitate buyers in evaluating camera models via the network 130. The application server 113 is coupled to the database server 115 that facilitates access to the database 116.

The client machine 120 includes a web client machine 122 (e.g., a browser) and/or a programmatic client 124, and is accessible to a buyer to interact with the commerce server system 110 via the network 130. The web client 122 of the client machine 120 may access the camera shopping system 114 via a web interface supported by the web server 112 for example. Similarly, the programmatic client 124 of the client machine 120 may access the various services and functions provided by the camera shopping system 114 via a programmatic interface provided by the API server 111 for example.

FIG. 1 also illustrates a third party server machine 160 that may include a third party application 162 and a third party database 164. The third party application 162 may have a programmatic access to the networked commerce server 110 via the programmatic interface provided by the API server 111, and thus may utilize information retrieved from the commerce server system 110. The third party database 164 may provide data to be utilized by certain camera shopping modules or components 200 in the camera shopping system 114.

While the product (e.g., camera) shopping system 114 in FIG. 1 forms part of the networked commerce server system 110, it will be appreciated that, in alternative embodiments, the product (e.g., camera) shopping system 114 may form part of an e-commerce shopping service that is separate and distinct from the networked system.

While the e-commerce shopping system 100 shown in FIG. 1 employs client-server architecture, the present application is not limited to such architecture, and could equally well find application in a distributed, multi-tiered or a peer-to-peer architecture system for example. The camera shopping system 114 could also be implemented as standalone software programs, hardware, or devices that do not necessarily have networking capabilities.

Camera Shopping System

FIG. 2 is a block diagram illustrating a product (e.g., camera) shopping system 114 including multiple product (e.g., camera) shopping modules (or components) 200 to facilitate buyers in product (e.g., camera) shopping in accordance with one example embodiment. The term "module" used in the following description denotes software, hardware, and/or a component.

In an embodiment, the product (e.g., camera) shopping modules (or components) 200 of the camera shopping system 114 may facilitate buyers in finding camera combinations via the network 130. In this embodiment, the product (e.g., camera) shopping modules (or components) 200 of the product (e.g., camera) shopping system 114 may include, but are not limited to, a mode selection interface 202, a product (e.g., camera) model presenting interface 204, a product (e.g., camera) accessory model presenting interface 206, a product (e.g., camera) model combination selection interface 208, a product (e.g., camera) combination search engine 210, a product (e.g., camera) combination ranking module 212, a product (e.g., camera) model selection module 214, a photo search engine 216, a photo ranking module 218, and a product (e.g., camera) model information presenting interface 220.

Figure 3A:
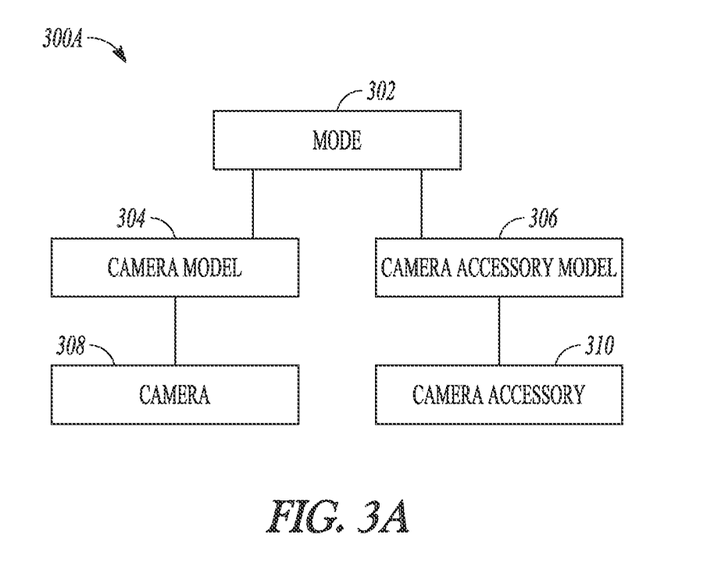
FIG. 3A is a high level entity-relationship diagram illustrating various tables maintained in a database in accordance with an embodiment.

In some embodiments, the mode selection interface 202 is configured to provide a buyer with some photography modes or themes (e.g., "portrait", "landscape", or "sports") on the client machine 120 as shown in FIG. 1. The mode selection interface 202 may receive a selection of a mode (e.g., "portrait") by the buyer from the provided modes. The photography modes may be stored in a photography mode table 302 (as shown in FIG. 3), which is stored in the database 116 (as shown in FIG. 1).

In some embodiments, the camera model presenting interface 204 is configured to present a list of camera models (e.g., Canon® EOS T1i, Nikon® D100, and Nikkor® AF 18-35) based on the selected mode (e.g., "portrait"). The list of camera models may be selected from a camera model table 304 (as shown in FIG. 3) stored in the database 116. The list of camera models may be ranked based on their performances on the selected mode (e.g., "portrait"). The number of camera models in the list of camera models may be predetermined (e.g., ten models).

In some embodiments, the camera accessory model presenting interface 206 is configured to present at least one list of camera accessory models (such as tripod models and/or flash light models) based on the selected mode (e.g., "portrait"). The at least one list of camera accessory models may be selected from a camera accessory model table 306 (as shown in FIG. 3) stored in the database 116. The at least one list of camera accessory models may be ranked based on their performances in the selected mode (e.g., "portrait"). The number of camera accessory models presented in the at least one list of camera accessory models may be predetermined (e.g., ten accessory models). In many situations, the camera model presenting interface 204 and the camera accessory model presenting interface 206 may be combined into one interface to present a buyer both the list of camera models and the at least one list of camera accessory models.

In some embodiments, the camera model combination selection module 208 is configured to receive a selection of a camera model combination by the buyer based on the mode (e.g., "portrait"). For example, the buyer may select a camera model combination, which includes a camera model (e.g., "Canon® EOS T1i") and at least one camera accessory model (e.g., a flash light, "Canon® 580 EX II") based on the mode (e.g., "portrait"). The camera model and the at least one camera accessory model may be selected respectively from the presented list of camera models and the presented list of camera accessory models.

In some embodiments, the camera combination search engine 210 is configured to retrieve a list of camera combinations based on the camera model combination (e.g., a camera model "Canon® EOS T1i" and a flash light "Canon® 580 EX II"). Each camera combination may include an actual camera of the camera model (e.g., "Canon® EOS T1i") and at least one actual camera accessory (e.g., a flash light) of the camera accessory model (e.g., "Canon® 580 EX II"), which are respectively supplied from one of many camera suppliers and one of many camera accessory suppliers. Information regarding the actual cameras may be stored in a camera table 308 (as shown in FIG. 3). Information regarding the actual camera accessories may be stored in a camera accessory table 310 (as shown in FIG. 3).

In some embodiments, the camera combination ranking module 212 is configured to rank the list of camera combinations based on a sum value of a camera value and a camera accessory value in each camera combination in the list of camera combinations. In many situations, actual cameras of the same camera model and actual camera accessory models of the same camera accessory model from different sources or suppliers may be different in price, shipment fee, capacity vs. price ratio, and/or reputation. The camera value may be related to a factor such as the price, shipment fee, capacity vs. price ratio, and/or reputation of the actual camera. The camera accessory value may be related to a factor such as the price, shipment fee, capacity vs. price ratio, and/or reputation of the actual camera accessory. The term "capacity" could be applied to any one or more features, such as number of pixels, amount of memory, transfer speed, etc.

For example, each camera combination of the list of camera combinations may have a sum price, which is a sum of the price of the camera and the price of the at least one camera accessory. The list of camera combinations may be ranked based on a sum price of each camera combination in the list of camera combinations in an order from low to high for example. The ranked list of camera combinations may facilitate buyers in finding camera combinations that may be attractive in price to them.

For example, each camera combination of the list of camera combinations may have a sum score, which is a sum of a score of the camera and a score of the at least one camera accessory. The score (e.g., 8 out of 10) of the camera and the score (e.g., 6 out of 10) of the camera accessory are respectively given by reviewers. The list of camera combinations may be ranked based on a sum score (e.g., 14) of each camera combination in the list of camera combinations in an order from or from high to low for example. The ranked list of camera combinations may facilitate buyers in finding camera combinations that may be attractive in reputation to them.

For example, each camera combination of the list of camera combinations may have a sum capacity/price ratio, which is a sum of a capacity/price ratio of the camera and a capacity/price ratio of the at least one camera accessory. The capacity/price ratio of the camera and the capacity/price ratio of the camera accessory are respectively given by a third party authority. The list of camera combinations may be ranked based on a sum capacity/price ratio of each camera combination in the list of camera combinations in an order from low to high (or from high to low). The ranked list of camera combinations may facilitate buyers in finding camera combinations that may be attractive in capacity/price ratio to them.

In some embodiments, the ranked list of camera combinations may be presented to the buyers via a display (e.g., a LCD displayer) on the client machine 120 to facilitate the buyer in finding a camera combination that is attractive to her.

In another embodiment, the camera shopping modules or components 200 of the camera shopping system 114 may facilitate buyers in evaluating camera models via the network 130. In this embodiment, the camera shopping modules or components 200 of the camera shopping system 114 may include, but are not limited to, a mode selection interface, a camera model selection module, a photo search engine, a photo ranking module, a camera model information presenting interface, and a display for example.

In some embodiments, as stated above, the mode selection interface 202 is configured to provide a buyer with some photography modes or themes (e.g., "portrait", "landscape", or "sports") on the client machine 120 as shown in FIG. 1. The mode selection interface 202 may receive a selection of a mode (e.g., "portrait") by the buyer from the provided modes. The photography modes may be stored in a photography mode table 302 (as shown in FIG. 3), which is stored in the database 116 (as shown in FIG. 1).

In some embodiments, the camera model selection module 214 is configured to receive a selection of a camera model (e.g., "Canon® EOS T1i") from a list of camera models based on the mode (e.g., "portrait").

In some embodiments, the photo search engine 216 is configured to retrieve a list of photos taken in the mode (e.g., "portrait") and by the camera model (e.g., "Canon® EOS T1i") to facilitate evaluating the camera model. The list of photos may be retrieved from the database 116 (as shown in FIG. 1) or from a database of a third party (e.g., Flickr®).

In some embodiments, the photo ranking module 218 is configured to rank the list of photos based on scores (e.g., between 0 and 100) given by viewers to the list of photos. For example, the ranked list of photos, taken by the selected camera model (e.g., "Canon® EOS T1i") in the selected photography mode (e.g., "portrait"), may facilitate the buyer in evaluating the selected camera model (e.g., "Canon® EOS T1i") based on its performance in the intended photography mode (e.g., "portrait").

In some embodiments, the ranked list of photos may be presented to the buyers via a display (e.g., a LCD displayer) on the client machine 120.

In some embodiments, the camera model information presenting interface 220 is configured to present detailed information about the camera model (e.g., "Canon® EOS T1i"), once the camera model is selected. The detailed information about the camera model may include promotion or on-sale information about the camera model. The detailed information about the camera model may also include sales trends information about the camera model.

While much of the specification is focused on camera products, various embodiments of the application may be applied to other products, such as camcorders, DVD players, digital video recorders, MP3 players and the like.

Data Structures

FIG. 3A is a high-level entity-relationship diagram illustrating various tables 300A that may be maintained within the databases 116 as shown in FIG. 1, and that support and are utilized by the multiple product (e.g., camera) shopping modules (or components) 200 as shown in FIG. 2. The various tables 300A may include, but are not limited to, a "mode" table 302, a "camera model" table 304, a "camera accessory model" table 306, a "camera" table 308, and a "camera accessory" table 310.

The "mode" table 302 may provide records to be used by the mode selection interface 202 for example. Each "mode" table 302 may include fields, but not limited to, a mode identifier and a mode name (e.g., "portrait").

The "camera model" table 304 may include fields such as, but not limited to, a camera model identifier, a camera model name (e.g., "Canon® EOS T1i"), a camera model description, and at least one mode identifier.

The "camera accessory model" table 306 may include fields such as, but not limited to, a camera accessory model identifier, a camera accessory category (e.g., "Flash Light"), a camera accessory model name (e.g., "Canon® 580 EX II"), a camera accessory model description, and at least one mode identifier.

The "camera" table 308 may include fields such as, but not limited to, a camera identifier, a camera name, a camera description, and a camera model identifier.

The "camera accessory" table 310 may include fields such as, but not limited to, a camera accessory identifier, a camera accessory name, a camera accessory category (e.g., "Flash Light"), a camera accessory description, and a camera accessory model identifier.

Figure 3B:
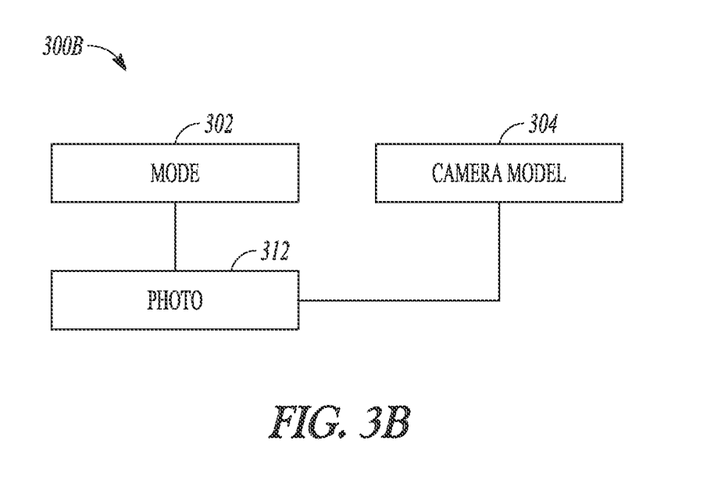
FIG. 3B is another high level entity-relationship diagram illustrating various tables maintained in a database in accordance with an embodiment.

FIG. 3B is another high-level entity-relationship diagram illustrating various tables 300B that may be maintained within the databases 116 as shown in FIG. 1, and that support and are utilized by the multiple camera shopping modules (or components) 200 as shown in FIG. 2. The various tables 300A may include, but are not limited to, the "mode" table 302 (as shown in FIG. 3A), the "camera model" table 304 (as shown in FIG. 3A), and a "photo" table 312. The "photo" table 312 may include fields such as, but not limited to, a photo identifier, a photo name, a camera model identifier.

Methods of Facilitating Finding Camera Combinations

Figure 4:
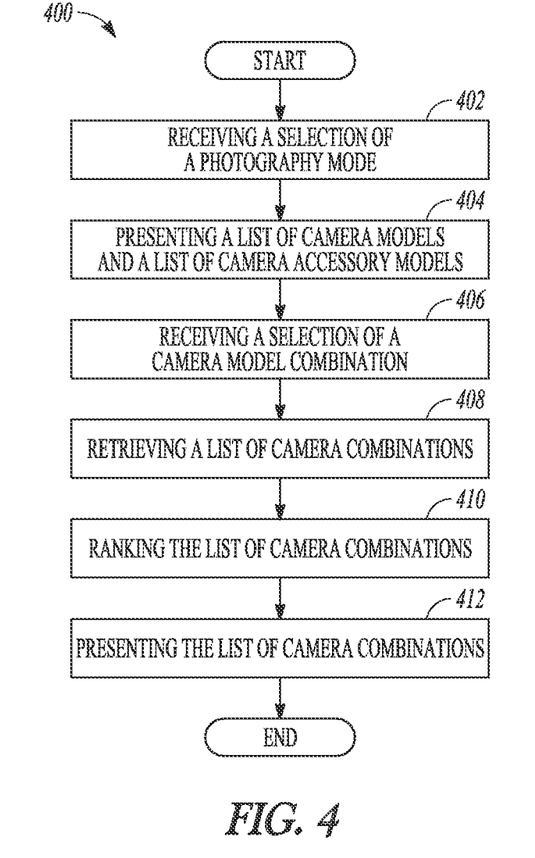
FIG. 4 is a flowchart illustrating a method for facilitating finding product (e.g., camera) combinations via a network in accordance with an embodiment.

FIG. 4 is a flowchart illustrating a method 400 of facilitating finding product (e.g., camera) combinations via a network in accordance with an embodiment.

At operation 402, a selection of a mode (e.g., "portrait") may be received from a plurality of photography modes (e.g., "portrait", "landscape", or "sports").

At operation 404, a list of camera models and a list of camera accessory models may be presented based on the selected mode (e.g., "portrait").

At operation 406, a selection of a camera model combination may be received. The camera model combination may include a camera model (e.g., "Canon® EOS T1i") and at least one camera accessory model (e.g., a flash light "Canon® 580 EX II", etc) respectively from the list of camera models and the list of camera accessory models.

At operation 408, a list of camera combinations based on the camera model combination may be retrieved from the database 116. Each camera combination may include an actual camera and at least one actual camera accessory respectively supplied from one of camera suppliers and one of camera accessory suppliers.

At operation 410, the list of actual camera combinations may be ranked based on a sum value of a camera value and at least one camera accessory value in each actual camera combination. In some embodiments, the camera value and the camera accessory value may respectively include a camera price and a camera accessory price. The camera value and the camera accessory value may also respectively include a camera score and a camera accessory score respectively given by users or reviewers. The camera value and the camera accessory value may also respectively include a camera capacity/price ratio and a camera accessory capacity/price ratio.

At operation 412, the ranked list of camera combinations may be presented via a display on the client machine 120 (as shown in FIG. 1) to the buyer to facilitate her in finding a camera combination that is attractive for her intended photography mode or use.

Methods of Facilitating Evaluating Camera Models

Figure 5:
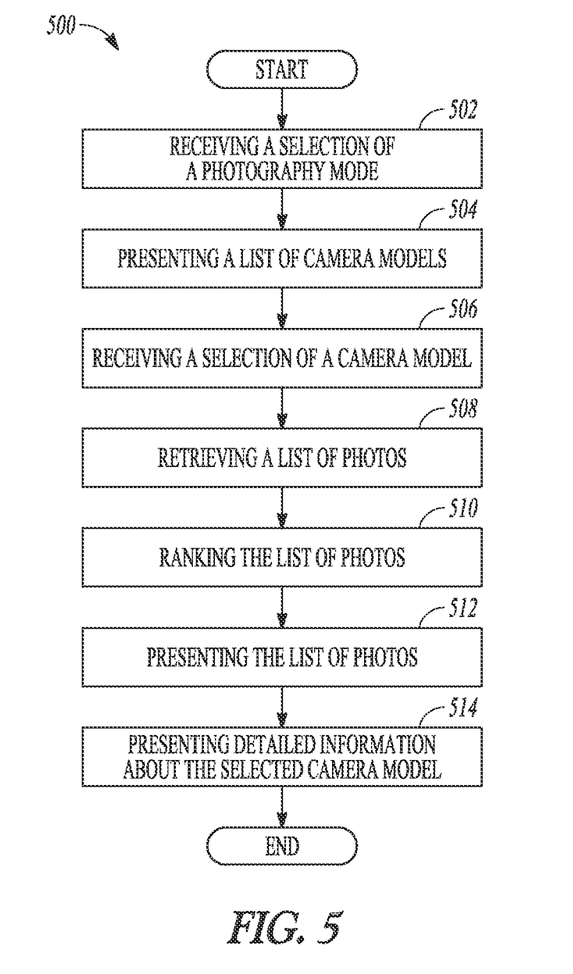
FIG. 5 is a flowchart illustrating a method for facilitating evaluating product (e.g., camera) models via a network in accordance with an embodiment.

FIG. 5 is a flowchart illustrating a method 500 of facilitating evaluating product (e.g., camera) models via, a network in accordance with an embodiment.

At operation 502, a selection of a product operational mode (such as a photography mode, e.g., "portrait") by a buyer from a plurality of modes (e.g., "portrait", "landscape", or "sports") may be received.

At operation 504, a list of product (e.g., camera) models (e.g., "Canon® EOS T1i", "Nikon® D100", or "Nikkor® AF 18-35" etc) may be presented based on the selected mode (e.g., "portrait").

At operation 506, a selection of a product (e.g., camera) model (e.g., "Canon® EOS T1i") may be received from the list of camera models.

At operation 508, a list of works (e.g., photos), taken by the selected product (e.g., camera) model (e.g., "Canon® EOS T1i") and in the selected product operational mode (e.g., "portrait"), may be retrieved from a work (e.g., photo) gallery. The work gallery may be stored in the database 116 (as shown in FIG. 1) or in a third party (e.g., Flickr®) database.

At operation 510, the list of works (e.g., photos) may be ranked based on scores (e.g., between 0 and 100) given by viewers to the list of works for example.

At operation 512, the ranked list of works (e.g., photos) may be presented to a buyer via a display on the client machine 120 (as shown in FIG. 1) to facilitate the buyer in evaluating the selected product model (e.g., "Canon® EOS T1i") based on its performance in the intended product operational mode (e.g., "portrait").

At operation 514, detailed information about the selected product (e.g., camera) model (e.g., "Canon® EOS T1i") may be presented, once the product (e.g., camera) model is selected.

While much of the specification is focused on camera products, various embodiments of the application may be applied to other products, such as camcorders, DVD players, digital video recorders, MP3 players and the like. Examples of works may include photos, audio works, video clips, etc.

An Example Computer System

Figure 6:
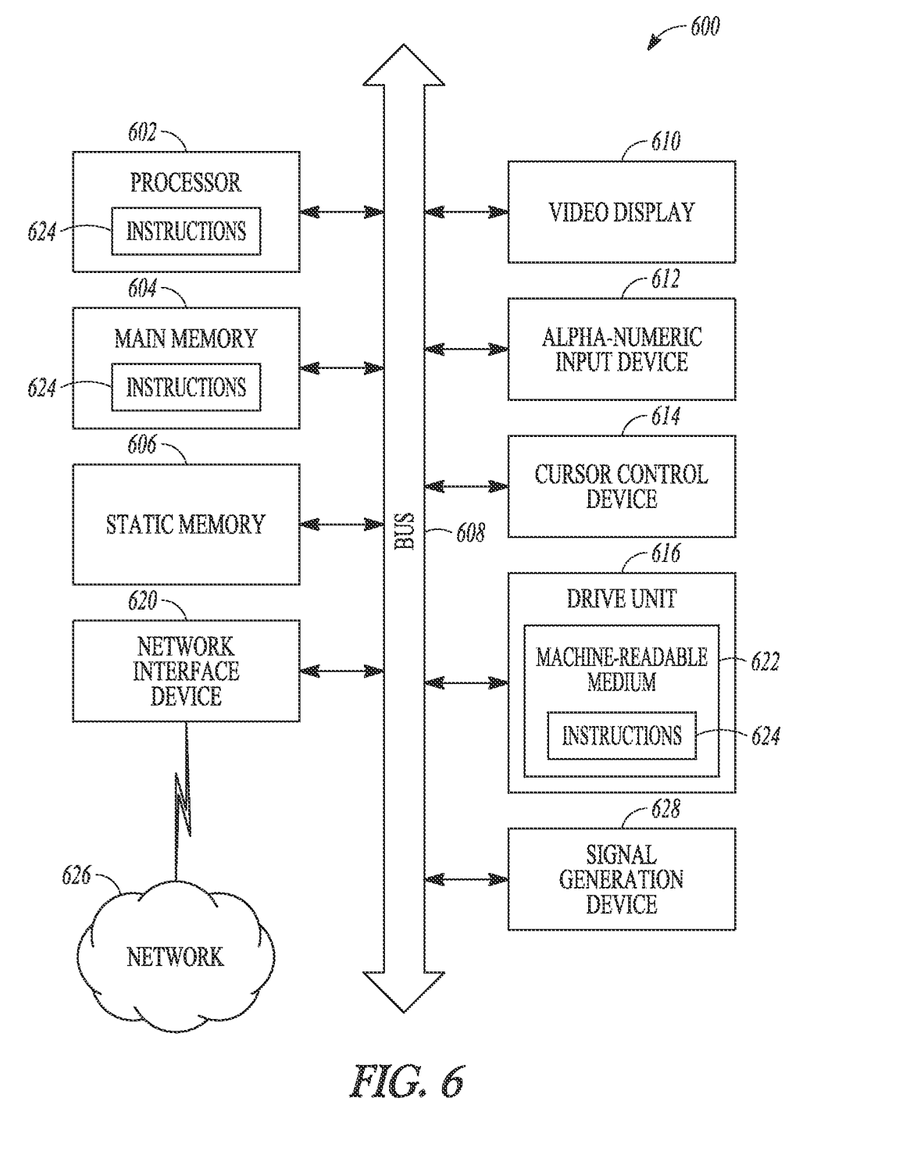
FIG. 6 is a block diagram illustrating a machine in the example form of a computer system, within which a set or sequence of instructions for causing the machine to perform any one of the methodologies discussed herein may be executed.

FIG. 6 is a block diagram illustrating a machine in the example form of a computer system 600, within which a set or sequence of instructions for causing the machine to perform any one of the methodologies discussed herein may be executed. In alternative embodiments, the machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions that specify actions to be taken by that machine. Further, while only a single machine is illustrated, the term "machine" shall also be taken to include any collection of machines that individually or jointly execute a set of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620. While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, methods and systems for facilitating buyers in camera shopping via networks have been described. Although the present application has been described with reference to specific embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method, comprising:
receiving a selection of a mode from a plurality of product operational modes;

presenting a list of product models and a list of product accessory models based on the mode separately;

receiving a selection of a product model combination including a product model from the list of product models and at least one product accessory model from the list of product accessory models;

retrieving a list of product combinations based on the selected product model combination from a database, each product combination including a product supplied from one of a plurality of product suppliers and at least one product accessory supplied from one of a plurality of product accessory suppliers;

ranking, using one or more processors, the list of product combinations based on a sum value of a product capacity/price ratio of the product and a product accessory capacity/price ratio of the at least one product accessory in each product combination; and presenting the ranked list of product combinations to buyers via a display on a machine to facilitate the buyers in finding a product combination that is attractive to the buyers.

2. The method of claim 1, wherein the mode includes a theme mode, wherein the list of product models includes at least one of a list of camera models, a list of video models, and a list of audio models, wherein the list of product accessory models includes at least one of a list of camera accessory models, a list of video accessory models, and a list of audio accessory models, wherein the product includes at least one of a camera product, a video product, and a audio product, and wherein the at least one product accessory includes at least one of a camera accessory, a video accessory, and an audio accessory.

3. A system, comprising:

a mode selection interface configured to receive a selection of a mode from a plurality of product operational modes;

a product model combination selection hardware module to receive a selection of a product model combination based on the mode, the product model combination including a product model from a list of product models and a product accessory model from a list of product accessory models;

a product combination search hardware engine to retrieve a list of product combinations based on the product model combination from a database, each of the list of product combinations including a product from one of a plurality of product suppliers and at least one product accessory supplied from one of a plurality of product accessory suppliers;

a processor configured by a product combination ranking hardware module to rank the list of product combinations based on a sum value of a product capacity/price ratio of the product and a product accessory capacity/price ratio of the at least one product accessory in each product combination; and a display on a machine to present the ranked list of product combinations to buyers to facilitate the buyers in finding a product combination that is attractive to the buyers.

4. The system of claim 3, further comprising:

a product model presenting interface configured to present the list of product models based on the mode; and a product accessory model presenting interface configured to present the list of product accessory models based on the mode.

5. The system of claim 3, further comprising:

a mode storage to store the plurality of theme modes;

a product model storage to store the list of product models;

a product accessory model storage to store the list of product accessory models;

a product storage to store the list of products; and a product accessory storage to store the list of product accessories.

6. A non-transitory machine-readable storage medium comprising instructions that, when executed by one or more processors of a machine, cause the machine to perform a method comprising:

receiving a selection of a mode from a plurality of theme modes;

presenting a list of product models and a list of product accessory models based on the mode separately;

receiving a selection of a product era model combination including a product model and at least one product accessory model respectively from the list of product models and the list of product accessory models;

retrieving a list of product combinations based on the product model combination from a database, each product combination including a product and at least one product accessory respectively supplied from one of product suppliers and one of product accessory suppliers;

ranking, using one or more processors, the list of product combinations based on a sum value of a product capacity/price ratio of the product and a product accessory capacity/price ratio of the at least one product accessory in each product combination; and presenting the ranked list of product combinations to buyers via a display to facilitate the buyers in finding a product combination that is attractive to the buyers.

* * * * *